US008009095B2

(12) United States Patent
Schlee et al.

(10) Patent No.: US 8,009,095 B2

(45) Date of Patent: Aug. 30, 2011

(54) ANTENNA ARRAY AND A METHOD FOR CALIBRATION THEREOF

(75) Inventors: Johannes Schlee, Ulm (DE); Martin Weckerle, Ulm (DE); Georg Schmidt, Laichingen (DE); Maik Riegler, Blaustein (DE)

(73) Assignee: Ubidyne, Inc., Wilmington, DE (US)

( * ) Notice: Subject to any disclaimer, the term of this patent is extended or adjusted under 35 U.S.C. 154(b) by 177 days.

(21) Appl. No.: 12/487,304

(22) Filed: Jun. 18, 2009

(65) Prior Publication Data

US 2010/0013709 A1 Jan. 21, 2010

Related U.S. Application Data

(60) Provisional application No. 61/074,372, filed on Jun. 20, 2008.

(30) Foreign Application Priority Data

Jun. 20, 2008 (GB) .................................. 0811336.7

(51) Int. Cl.
*H01Q 3/00* (2006.01)
*G01S 3/28* (2006.01)

(52) U.S. Cl. ........................................ 342/368; 342/384

(58) Field of Classification Search .................. 342/368, 342/384

See application file for complete search history.

(56) References Cited

U.S. PATENT DOCUMENTS

| | | | | |
|---|---|---|---|---|
| 6,480,153 | B1 | 11/2002 | Jung et al. | |
| 6,483,459 | B1 * | 11/2002 | Hou et al. | 342/378 |
| 6,693,588 | B1 | 2/2004 | Schlee | |
| 7,102,569 | B2 | 9/2006 | Tan et al. | |
| 7,295,157 | B2 * | 11/2007 | Azuma | 342/368 |

(Continued)

FOREIGN PATENT DOCUMENTS

EP 1178562 2/2002

(Continued)

OTHER PUBLICATIONS

S. Kobayakawa, et al., "A Blind Calibration Method for an Adaptive Antenna Array in DS-CDMA Systems using an MMSE Algorithm", Vehicular Technology Conference Proceedings, 2000, VTC2000, IEEE 51st vol. 1, pp. 21-25.

(Continued)

*Primary Examiner* — Harry Liu

(74) *Attorney, Agent, or Firm* — Stephen H. Eland; Dann, Dorfman, Herrell & Skillman

(57) ABSTRACT

An antenna array (10) for the transmission of signals (20) is disclosed. The antenna array (10) comprises: a plurality of transmission paths (30-1, 30-2, 30-K) for transmitting a plurality of wanted signals (25) and at least one calibration signal generator (40-1, 40-2, 40-K) for the generation of at least one calibration signal (45). A plurality of calibration signal mixers (50-1, 50-2, 50-K) mixes the at least one calibration signal (45) with the plurality of wanted signals (25) to produce a plurality of transmission signals (20). A path sum signal device (60) sum the plurality of transmission signals (20) to produce a summed transmission signal (65); and an interference estimator (90) accepts the at least one calibration signal (45) and generates an estimated interference signal (92). An estimation signal mixer (95) subtracts from the summed transmission signal (65) the estimated interference signal (92) to produce a difference signal (97); and a on signal detection unit (70) for comparing the signal (97) with the at least one calibration signal (45).

10 Claims, 11 Drawing Sheets

U.S. PATENT DOCUMENTS

| | | | | |
|---|---|---|---|---|
| 7,760,133 | B2 * | 7/2010 | Shirai et al. | 342/159 |
| 2004/0088610 | A1 | 5/2004 | Kobayakawa | |
| 2004/0142729 | A1 | 7/2004 | Yuda et al. | |
| 2005/0140546 | A1 | 6/2005 | Park et al. | |

FOREIGN PATENT DOCUMENTS

| | | |
|---|---|---|
| EP | 1515455 | 3/2005 |
| JP | 2002-77016 | 3/2002 |

OTHER PUBLICATIONS

B. Widrow et al., "The Complex LMS Algorithm", Proceedings Letters, IEEE, Apr. 1975, vol. 63, Issue 4, pp. 719-720.

C. Passmann et al., "Investigation of a Calibration Concept for Optimum Performance of Adaptive Antenna Systems", Vehicular Technology Conference, 1998, 48th IEEE, vol. 1, pp. 577-580.

* cited by examiner

ANTENNA ARRAY AND A METHOD FOR CALIBRATION THEREOF

CROSS-REFERENCE TO RELATED APPLICATIONS

This application claims the priority of and benefit to U.S. Provisional Application No. 61/074,372 filed on 20 Jun. 2008 and UK Patent Application No. 0811336.7 filed on 20 Jun. 2008. The entire disclosures of both applications are herein incorporated by reference.

SUMMARY OF THE INVENTION

The field of the invention relates to a method of calibration of an antenna array and an antenna array using the method of calibration.

BACKGROUND OF THE INVENTION

Active antenna arrays comprise a plurality of transceiver modules for receiving and transmitting signals. To operate the active antenna array in an efficient manner, transmitter paths to the transceiver modules have to be calibrated in order so that the transmitter paths work together in a coherent manner. In other words, magnitude and phase of individual signals on the transmitter paths have to be synchronized to ensure that the individual signals on the transmitter paths are coherently combined and also to allow accurate signal processing means, such as beam-forming, tilting, or delay diversity techniques.

To be able to synchronize the plurality of the transmitter paths, the magnitude deviations and the phase deviations between the transmitter paths have to be determined in order to compensate for the magnitude deviations and the phase deviations of the individual signals by signal processing means. Some of the magnitude deviations and the phase deviations are induced by deterministic effects (e.g. different cable lengths) and may be calibrated offline during manufacturing. However, in most antenna arrays, there are time-varying statistical effects which additionally require an online calibration technique to compensate for such time-varying statistical effects.

The calibration of the transmitter paths is an element in constructing active antenna arrays. There are several methods known in the literature for performing the calibration of the transmitter path. Two different types of calibration methods may be distinguished: “blind” calibration methods and “pilot-based” calibration methods. Blind calibration methods estimate the magnitude and phase deviations by observing and comparing signals at the input and the output of the antenna system. Pilot-based calibration methods use known auxiliary signals to measure any deviations between the transmitter paths.

A common pilot-based calibration method injects a calibration signal into the so-called wanted signal. The calibration signal can be detected in the wanted signal and can be uniquely attributed to a particular one of the transmitter paths. The calibration needs to be done in such a manner that the calibration signal does not significantly interfere with the wanted signal. In order to do this, the calibration signal should be of low power. On the other hand, to achieve a high degree of accuracy for the calibration, the calibration signal has to carry a significant amount of energy. In order to solve this conflict, several known calibration methods use some kind of low-power pseudo-noise sequences which spread the energy of the calibration signal over a large period of time and a large frequency band. However, if the power of the calibration signal is smaller than the power of the wanted signal by several orders of magnitude, the required processing gain requires such long pseudo-noise sequences which may render the time period of the calibration process unfeasibly long.

Blind calibration methods work without requiring an interfering pilot signal (or calibration signal). Blind calibration methods observe the wanted signal at the input and at the output of the antenna arrays and use the difference between the input signal and the output signal to adapt a model of the active antenna array which is to be calibrated. It has been found, however, that such blind calibration methods may tend to become instable or inaccurate for larger magnitude and phase deviations. Thus blind calibration methods are usually only used in systems which are already substantially pre-calibrated.

A number of prior art patents are known in which calibration methods are discussed. For example, U.S. Pat. No. 6,693,588 (Schlee, assigned to Siemens) discusses an electronically phase-controlled group antenna which is calibrated in radio communication systems using a reference point shared by all the reference signals. In the down-link procedure, reference signals which are distinguishable from one another are simultaneously transmitted by individual ones of the antenna elements of the antenna array. The reference signals are separated after reception at the shared reference point.

U.S. Pat. No. 7,102,569 (Tan et. al., assigned to Da Tang Mobile Communications Equipment, Bej Jing) teaches a method for establishing transmission and receiving compensation coefficients for each one of the antenna elements relative to a calibration antenna element.

European Patent Application No. 1 178 562 (Ericsson) teaches a method and a system for calibrating the reception and the transmission of an antenna array for use in a cellular communication system. The calibration of the reception of the antenna array is performed by injecting a single calibration signal into each of the plurality of the receiving antenna sections in parallel. The signals are collected after having passed receiving components which might distort the phase and the amplitude of the signals. Correction factors are generated and are applied to receive signals. The calibration of the transmission of the antenna array is performed by generating a single calibration signal into each of the plurality of the transmitting antenna sections. The signals are collected and correction factors are generated and applied to signals.

SUMMARY OF THE INVENTION

The array enables the performance of pilot based online calibration techniques by cancelling the interference on the calibration signal induced by the known wanted signal.

The disclosure describes an antenna array for the transmission of wanted signals. The antenna array has a plurality of transmission paths which transmit the plurality of wanted signals and one or more calibration signal generators for the generation of a calibration signal. Either the calibration signal is sequentially mixed with the plurality of calibration signals one after another, or the plurality of calibration signals are mixed with the plurality of wanted signals in one of a plurality of calibration signal mixers in order to produce a plurality of transmission signals. The antenna array further comprises a path sum signal device for summing of the plurality of transmission signals to produce a summed transmission signal which is passed to an estimation signal mixer. The estimation signal mixer subtracts from the summed transmission signal the estimated interference signals (generated from the plurality of calibration signals) to produce an interference/transmission signal. A calibration signal detector is used to detect the calibration signal (or a plurality of calibration signals) in the summed transmission signals. The calibration signal detector may be implemented by a correlation unit which correlates the transmission/interference signal with the plurality of calibration signals. The correlation unit passes the information to a calibration unit which is connected to the correlation unit and produces correction factors for the plurality of transmission paths.

If a plurality of calibration signals are used, the calibration signals are preferably orthogonal to each other in order to avoid interference between the different ones of the calibration signals In one aspect of the disclosure the estimated interference signal is produced by a so-called least mean square approach.

The disclosure also described a method for the calibration of the antenna array which comprises in a first step generating one or more calibration signals and mixing the one or more calibration signals with the wanted signal in order to produce a plurality of transmission signals. The plurality of transmission signals is summed and an estimated interference signal generated. The estimated interference signal is subtracted from the summed plurality of transmission signals to produce a difference signal. The difference signal is then compared with at least one calibration signal.

From the comparison (e.g. a correlation) of the calibration signals with the difference signal correction factors are generated in order to compensate for the phase and magnitude deviations of the transmitter path.

DETAILED DESCRIPTION OF THE INVENTION

For a complete understanding of the present invention and the advantages thereof, reference is now made to the following detailed description taken in conjunction with the Figures.

It should be appreciated that the various aspects of the invention discussed herein are merely illustrative of the specific ways to make and use the invention and do not therefore limit the scope of invention when taken into consideration with the claims and the following detailed description. It will also be appreciated that features from one embodiment of the invention may be combined with features from another embodiment of the invention.

The entire disclosure of U.S. Pat. Nos. 6,693,588 and 7,102,569, as well as European Patent No. 1,178,562 are hereby incorporated by reference into the description.

An object of the present system is to enhance a “classical” approach for pilot based online calibration in such a way that interference of a wanted payload signal to the injected calibration signal is reduced or, preferably, substantially cancelled. This can be achieved by adaptively estimating the effects of the transmitter paths on the transmitted signal. This allows for the subtraction of an estimate of the wanted signal from the measured signal prior to correlation, which eliminates most interference of the wanted signal to the correlation results. In this way, the signal to noise ratio (SNR) between the calibration signal and the wanted signal can be significantly improved.

A method for estimating the transmitted signal is obtained by a normalized least mean square (NLMS) approach. This method requires only a few signal processing steps and can therefore be implemented in a very inexpensive way. Hence, in the following description we shall describe a method for pilot based calibration with interference cancellation using the NLMS approach. However, the basic idea of the array is not limited to this approach, but can also be realized with other signal estimation techniques.

Figure 1A:
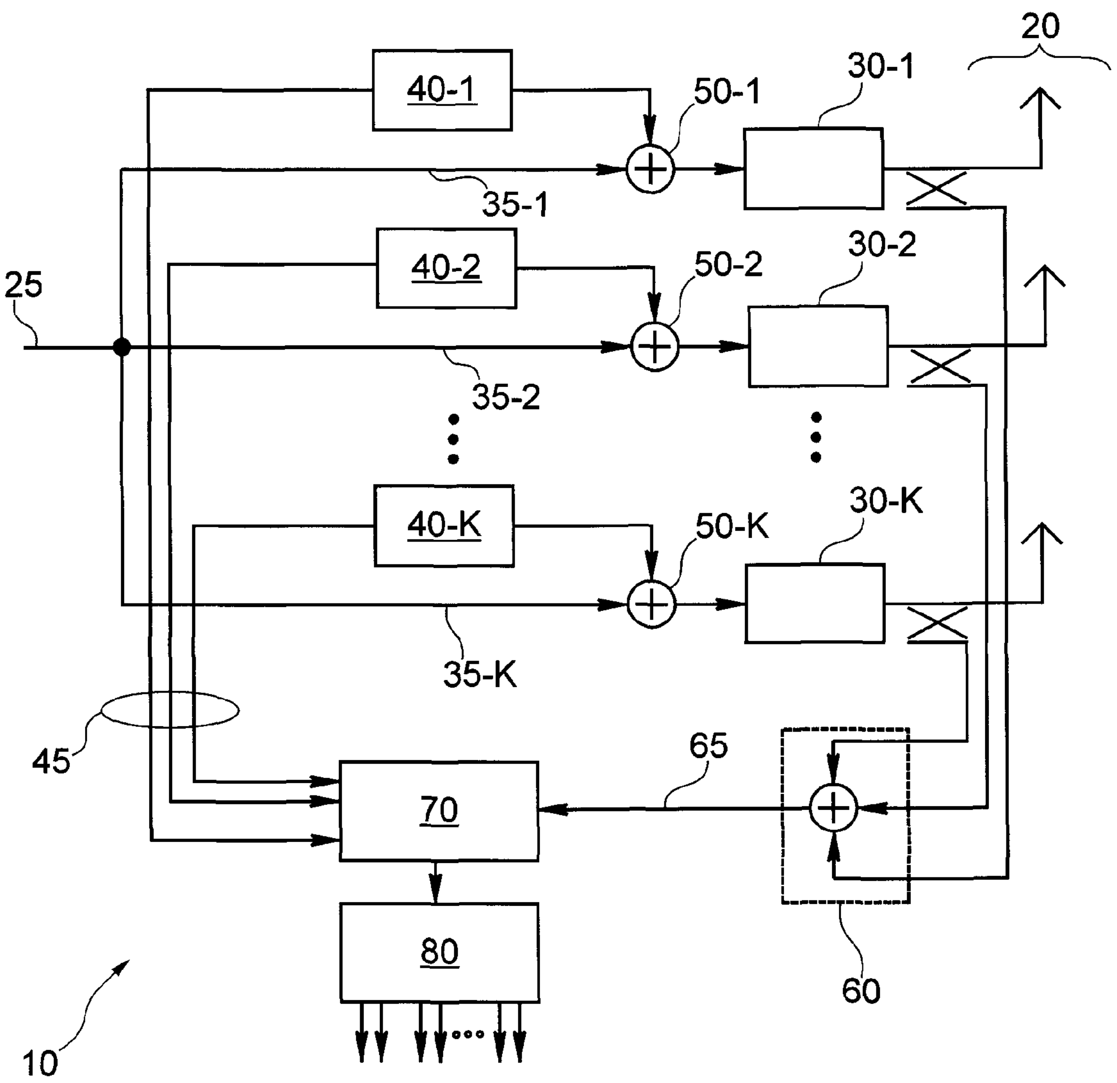
FIG. 1*a* shows one embodiment of an active antenna array according to the prior art.
Figure 1B:
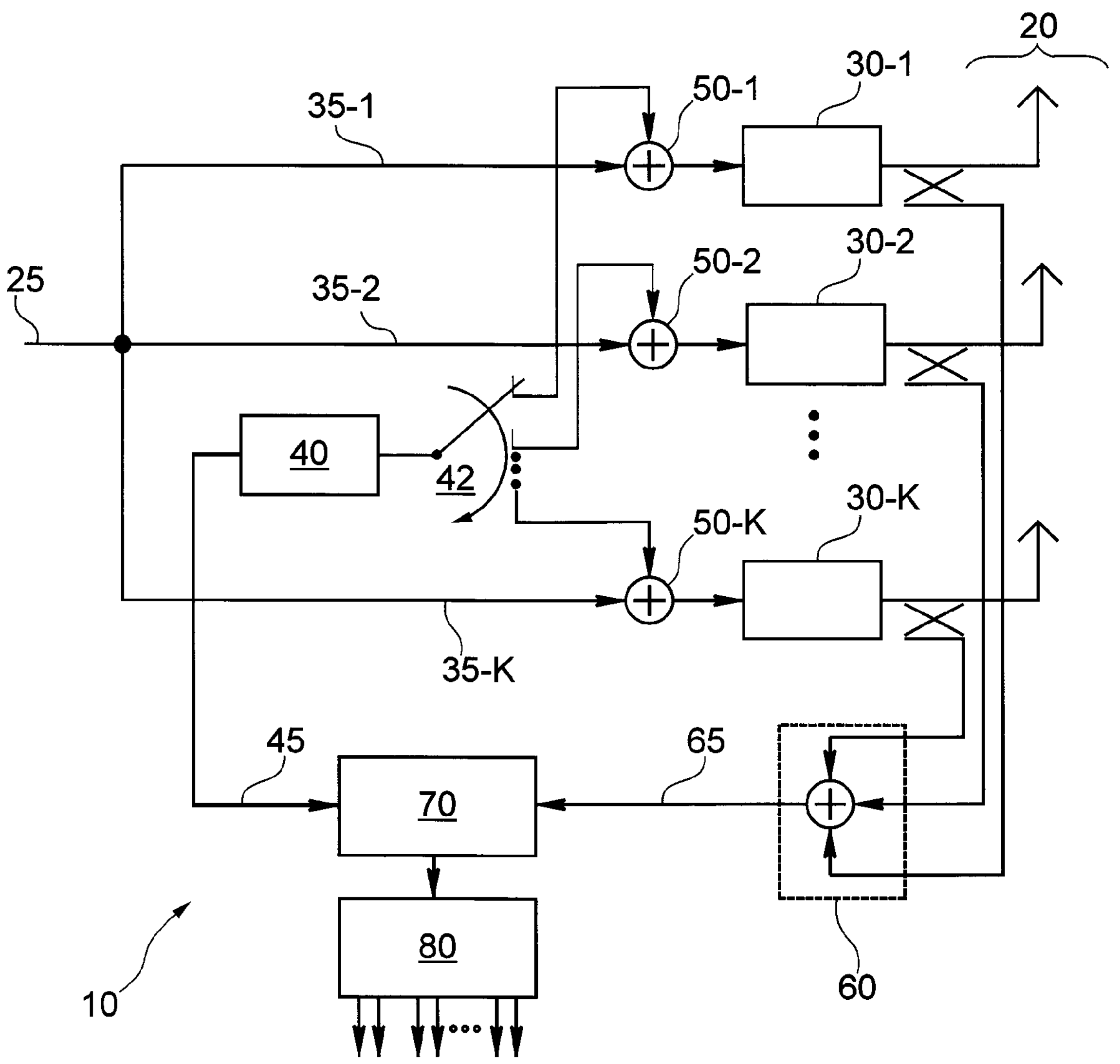
FIG. 1*b* shows another embodiment of an active antenna array according to the prior art.

In order to understand the present system, it will be useful to consider a classical pilot based calibration as depicted in FIGS. 1*a* and 1*b*. FIG. 1*a* shows an example of an antenna array 10 for the transmission of payload signals 20. A wanted signal 25 is split and distributed into—in this example k transmitter paths 35-1, 35-2, . . . , 35-K (collectively termed 35). In each one of the k transmitter paths 35, calibration signals 45 generated in calibration signal generators 40-1, 40-2, . . . , 40-*k* (collectively termed 40) are injected into the wanted signal 25 through calibration signal mixers 50-1, 50-2, . . . , 50-K prior to feeding the wanted signal into the transmitter modules 30-1, 30-2, . . . , 30-K (collectively termed 30).

It will be noted that it is irrelevant whether the k individual calibration signals 45 are injected simultaneously into all of the individual ones of the transmitter paths 35 (termed “parallel calibration”) or whether the calibration signals 45 are injected sequentially one after another to different ones of the transmitter paths 35.

At the RF output of the transmitter modules 30 the individual components of the transmission signal 20 are measured again and combined at a path summer 60 into a path sum signal 65. The path sum signal 65 is in this example digitized and fed back to a signal detection unit 70 which compares the path sum signal 65 with the sum of the calibration signals 45. The output of the signal detection unit 70 can be sent to a calibration unit 80 which calculate amplitude and phase correction values for calibrating the transmitter paths 35. In one aspect of the disclosure, the signal detection unit 70 is a correlator which correlates the path sum signal 65 with the sum of the calibration signals 45.

The wanted signal 25 transmitted by the active antenna array 10 is—at least from the viewpoint of the calibration signals 45—interference. The wanted signal 25 therefore degrades the calibration accuracy or renders the calibration substantially impossible. To compensate for this interference from the wanted signal 25, it is necessary to either increase signal power of the sequence of calibration signals 45 (which increases unwanted side effects to the wanted signal 25 and system environment) or duration of the calibration signal 45 has to be extended (which significantly slows down a calibration procedure). The disadvantages are discussed in the introduction.

The wanted signal 25 is known to the antenna array 10. Thus the interference of the wanted signal 25 can be approximately estimated. The present system provides a method and apparatus for estimating the interference of the wanted signal 25 and removes the interference from the path sum signal 65 prior to correlation. This kind of interference cancellation improves the calibration accuracy at a given power and duration of the calibration signal 45. Alternatively this kind of interference cancellation reduces degradation of the quality of the payload signal and speeds up the calibration process. FIG. 1*b* shows an alternative aspect of the prior art in which a single calibration signal generator 40 is switched by a switch 42 between the calibration signal mixers 50-1 to 50-K.

The theory for the estimation of the interference will now be explained. Let us assume that each one of the transmitter paths 35 applies a magnitude deviation and a phase deviation to the complex valued payload signal 20 which is going to be transmitted over the antenna array 10. Hence, neglecting at present the calibration signals 45, the payload signal 20 can be modeled as equivalent baseband signal as $$y[k] = \sum_{i=1}^{K} x_i[k]\alpha_i \exp(j\varphi_i) = \sum_{i=1}^{K} x_i[k]a_i. \quad \text{Eqn (1)}$$

where y[k] represents the payload signal 20 from the K transmitter paths 30 and $x_i[k]$ represents the wanted signal 25.

If the wanted signals 25 fed to all of the transmitter paths 30 are identical, i.e. if $$x_i[k] = \frac{1}{K}x[k] \forall\, i = 1 \ldots K,$$

then Eqn 1 simplifies to $$y[k] = \frac{1}{K}x[k]\sum_{i=1}^{K} a_i = hx[k]. \quad \text{Eqn 2}$$

This simplification is also valid if the wanted signals 25 on the transmitter paths 30 differ by a complex factor.

The Equation 2 indicates that the payload signal 20 y[k] is obtained from the wanted signal 25 x[k] simply by multiplying the value of the payload signal 20 x[k] by the complex factor h. Hence, estimating the payload signal 20 y[k] is equivalent to estimating the complex factor h. Since the complex factor h can be considered as a (degenerate) filter, this leads to a classical filter estimation problem which may be solved for example by a least mean squares (LMS) approach.

Figure 2:
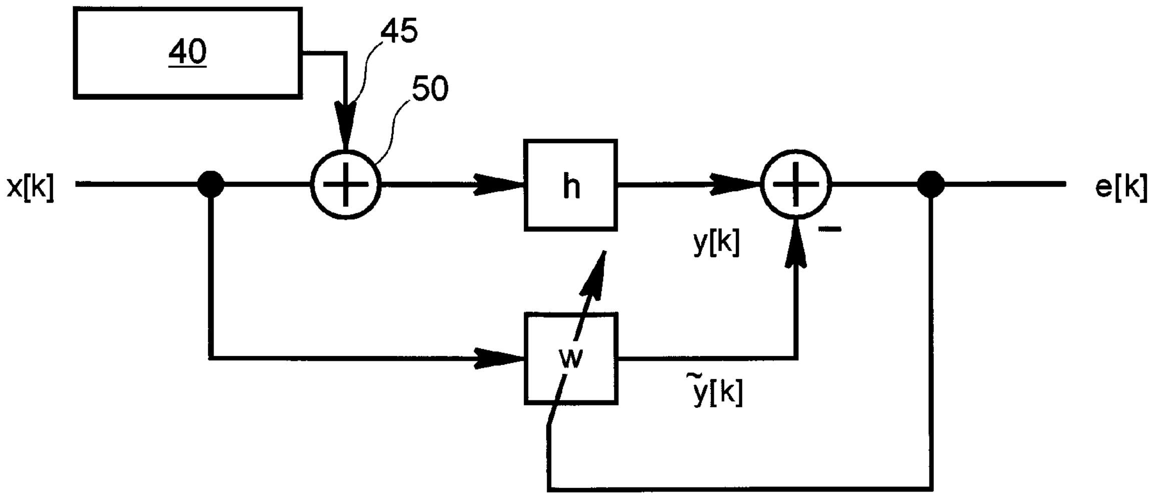
FIG. 2 shows an adaptive filter for estimating the interference signal.

The LMS approach is depicted graphically in FIG. 2. The output signal y[k] (which in the antenna array 10 is the payload signal 20) is obtained by feeding the sum of the input signal x[k] (wanted signal 25) and the calibration signal 45 from the calibrations signal generator 40 through the filter h. The sum is calculated in the calibration signal mixer 50. Filtering the input signal x[k] by an additional adaptive filter w, which is supposed to mimic the filter h, yields the signal ỹ[k] which may be considered as estimate for the signal y[k].

If the additional adaptive filter w mimics the filter h, then the error signal e[k] is minimized where $$e[k]=y[k]-\tilde{y}[k] \quad \text{Eqn. 3}$$

Whereby e[k] will, of course, be zero in the event of a perfect mimic.

Hence the error signal e[k] is a suited measure for adapting the filter w. More precisely, an LMS approach uses the mean square of the error signal, i.e. $E\{|e[k]|^2\}$, as a cost function to derive a quantity for gradually adapting the filter w in such a way that the mean square error is minimized.

The expectation value $E\{|e[k]|^2\}$ can usually not directly be obtained and is usually estimated by averaging. The expected value is very roughly approximated by $$E\{|e[k]|^2\} \approx |e[k]|^2 = e[k]e^*[k], \quad \text{Eqn (4)}$$

where e*[k] denotes the complex conjugate of e[k]. It is known that, even though Eqn. 3 appears to be a very rough estimate, it turns out that Eqn 4 is quite suited to be used as cost function for the LMS approach. Hence, for the sake of a low complexity approach we will use Eqn. 4 as the cost function in one aspect of the present system.

Since e[k]=y[k]−w[k]x[k] and e*[k]=y*[k]−w*[k]x*[k] we obtain the function $$c(w[k])=e[k]e^*[k]=(y[k]-w[k]x[k])(y^*[k]-w^*[k]x^*[k]) \quad \text{Eqn. (5)}$$

Eqn. 5 depends on the complex variable w[k]. The function c(w[k]) is used as cost function to optimize the filter coefficient w.

A common method to optimize the filter coefficient w is a steepest decent method. The steepest descent method requires the gradient of the cost function c(w[k]) to be calculated.

This is disclosed in disclosed in B. Widrow, J. McCool, M. Ball, The complex LMS algorithm, Proc. IEEE, Vol. 63, Issue 4, pp. 719-720, April 1975, this can be done using the following equations:

$$\nabla_R(c(w[k]))=\nabla_R(e[k]e^*[k])=e[k]\nabla_R(e^*[k])+e^*[k]\nabla_R(e[k])=-e[k]x^*[k]-e^*[k]x[k]$$

$$\nabla_I(c(w[k]))=\nabla_I(e[k]e^*[k])=e[k]\nabla_I(e[k])+e[k]\nabla_I(e[k])=je[k]x^*[k]-je^*[k]x[k] \quad \text{Eqn. (6)}$$

For a given input signal x[k] and error signal e[k], the Equation (6) enables the update for the filter coefficient w in the direction of the steepest descent, i.e. in the opposite direction of the gradient. This yields $$w[k+1]=w[k]-\mu/\nabla_R(e[k]e^*[k])+j\nabla_I(e[k]e^*[k])]=w[k]+2\mu e[k]x^*[k]. \quad \text{Eqn. (7)}$$

The factor μ in Eqn. 7 is called a learning factor and controls stability and convergence speed of the algorithm. It has been found that, since the LMS approach is sensitive to the scaling of the input signal x[k], choosing an appropriate value for the learning factor μ must be chosen. For this reason we apply a normalized least means squares (NLMS) approach, which normalizes the learning factor μ by $|x[k]|^2$=x[k]x*[k]. In this way we obtain $$w[k+1] = w[k] - \frac{\mu_0}{|x[k]|^2}e[k]x*[k]. \quad \text{Eqn. (8)}$$

The Eqn. 8 is a simple adaptation rule for the filter w which is simple and can be implemented with a very small hardware complexity.

With a properly chosen step size $\mu_0$, the estimate ỹ[k] for the signal y[k] obtained from the adaptive filter arrangement depicted in FIG. 2 is accurate enough to cancel nearly the complete interference on the calibration signal 45. $\mu_o$ is (in principle) a freely selectable parameter which influences stability and convergence speed of the adaptive filter. If $\mu_0$ is chosen to be too large, the system could become instable, if $\mu_0$ is chosen to be too small, the convergence speed is low, which in turn limits the filter to follow time variations fast enough. The parameter $\mu_0$ has to be optimized for a particular application, i.e. $\mu_0$ depends among other things on the SNR of the wanted signal to be estimated.

Figure 3A:
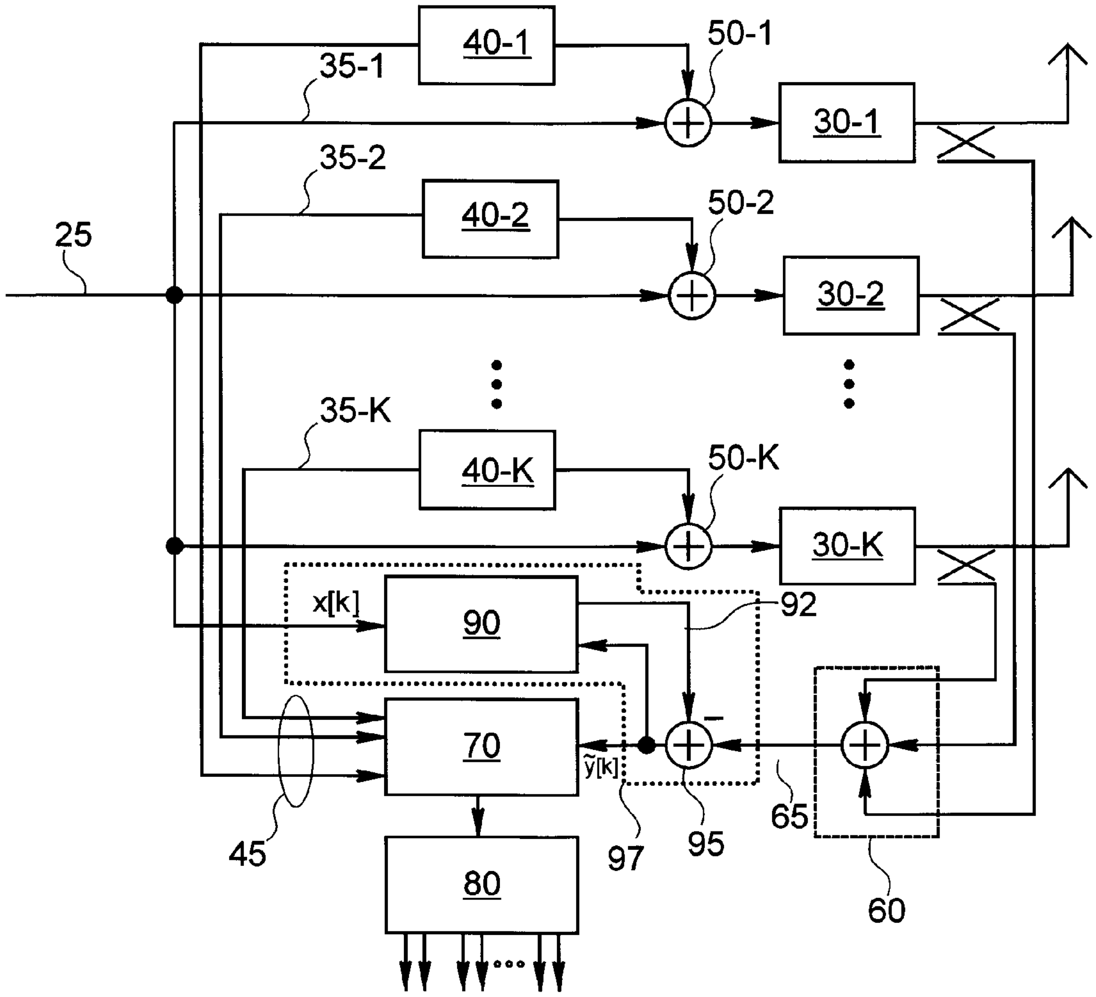
FIG. 3*a* shows an active antenna array with a plurality of calibration signal generators and an adaptive estimator for interference cancellation.

FIG. 3*a* shows one embodiment of the antenna array 10 of FIG. 1 having a plurality of the calibration signal generators 40-1 to 40-K with an interference estimator 90 producing an estimated interference signal 92. The estimated interference signal 92 is subtracted from the path sum signal 65 to produce a difference signal 97 that is an input signal to the signal detection unit 70. The difference (input) signal 97 is fed back to the interference estimator 90.

Figure 4:
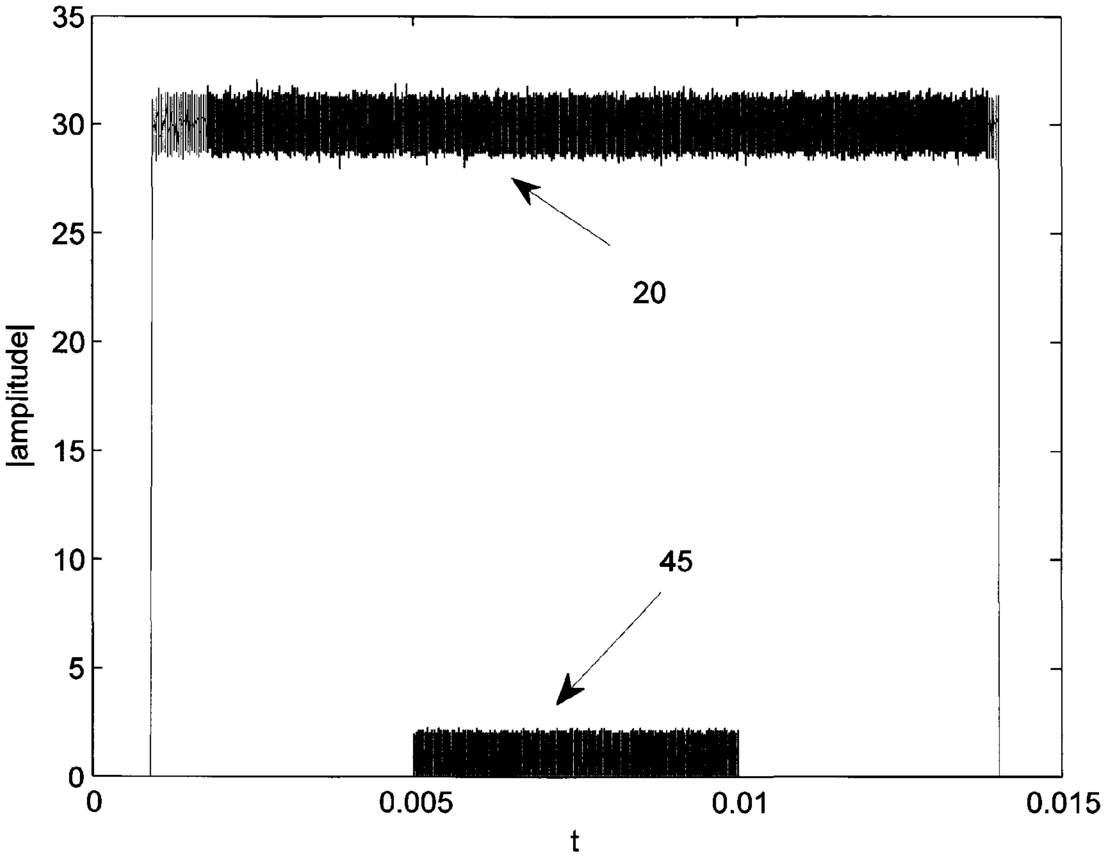
FIG. 4 shows a signal buried under a payload signal.

To demonstrate the effectiveness of the present system, first consider the calibration signal 45 in the time domain. FIG. 4 shows a payload signal 20 and a calibration signal 45 at a signal to noise ratio of 10 dB, i.e. the power of the payload signal 20 is 10 dB above the power of the calibration signal 45.

Figure 5:
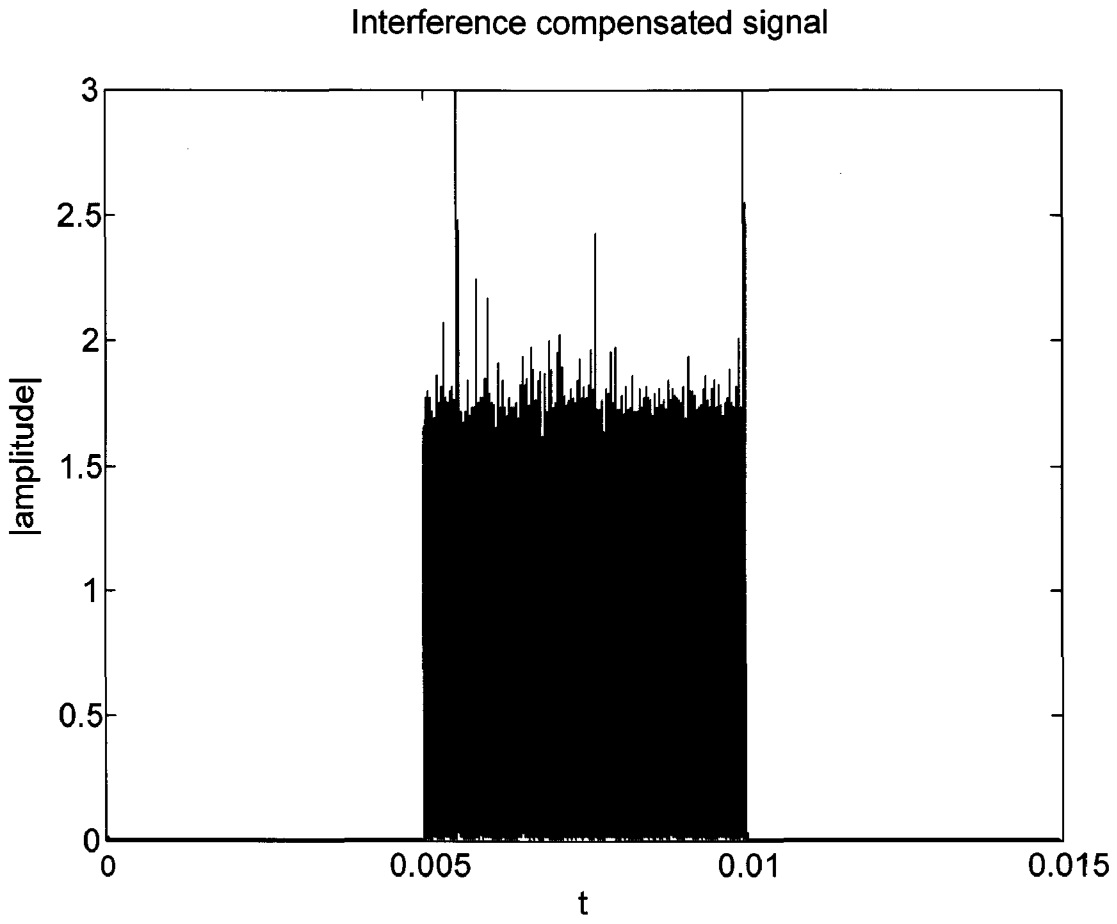
FIG. 5 shows the calibration signal and the interference compensated signal after applying interference cancellation

The interference cancellation technique of the present system was applied and, FIG. 5 shows the difference input signal 97 after interference cancellation. The interference cancellation is the estimated interference signal 92 shown in FIG. 3*a* and is equivalent to the error signal e[k] of FIG. 2. It will be noted that the received signal is simply a noisy version of the calibration signal 45. This means that the interference from the payload signal 20 has been substantially removed from the calibration signal 45 by the present system.

Figure 3B:
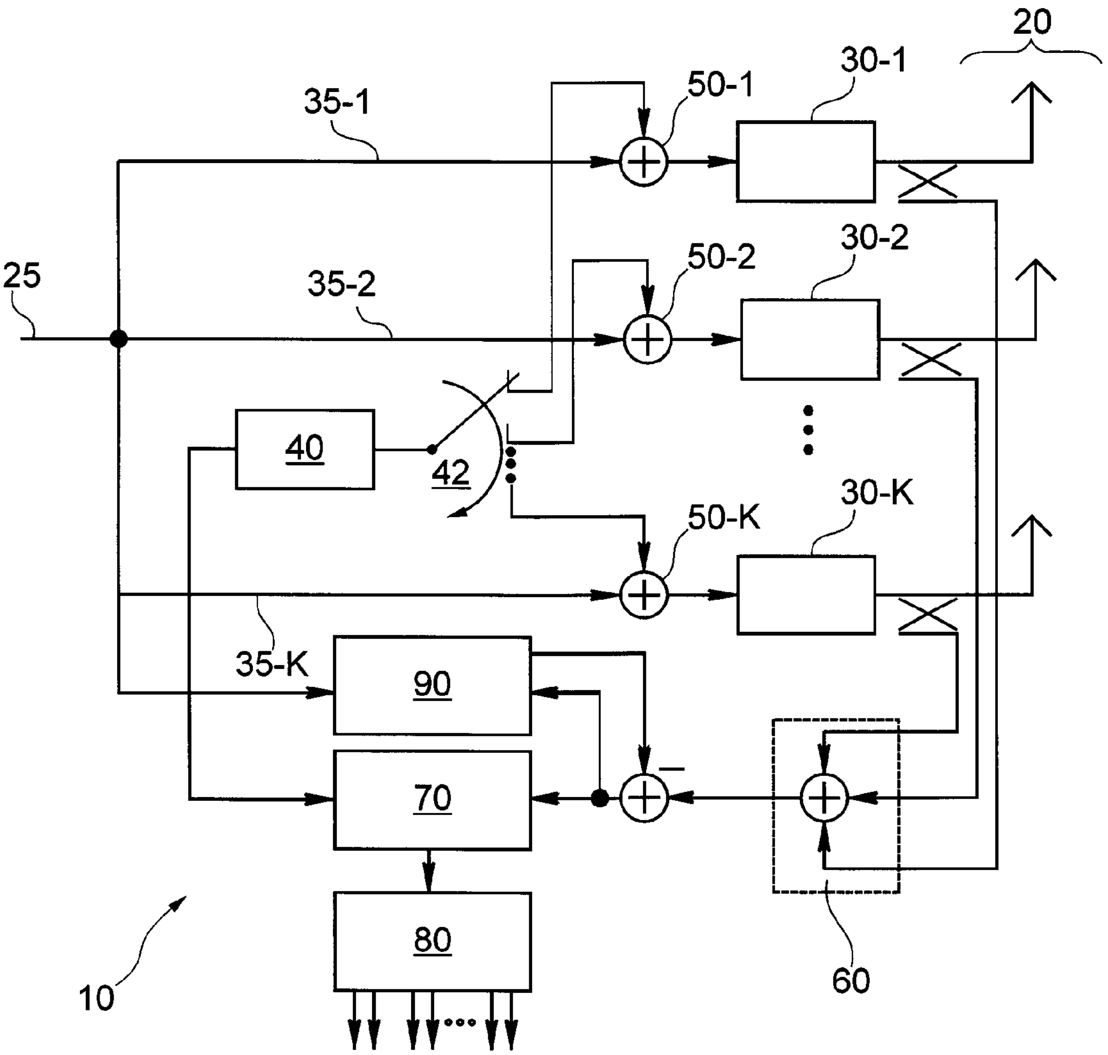
FIG. 3*b* shows an active antenna array with a single calibration signal generator switched between different transmitter paths as well as an adaptive estimator for interference cancellation.

An alternative embodiment is depicted in FIG. 3*b* which shows a single calibration signal generator 40 which can be connected to any one of the transmitter paths 35-1 to 35-K. It will be appreciated that the single calibration signal generator 40 can generate sequentially the calibrations signals 45 on the transmitter paths 35-1 to 35-K. It will furthermore appreciated that there may be further ones of the calibration signal generators 40 connectable to different ones of the transmitter paths 35-1 to 35-K.

The interference cancellation method of this system enables the recovery of the calibration signal 45 under a payload signal 20 with a significantly higher power.

Figure 6:
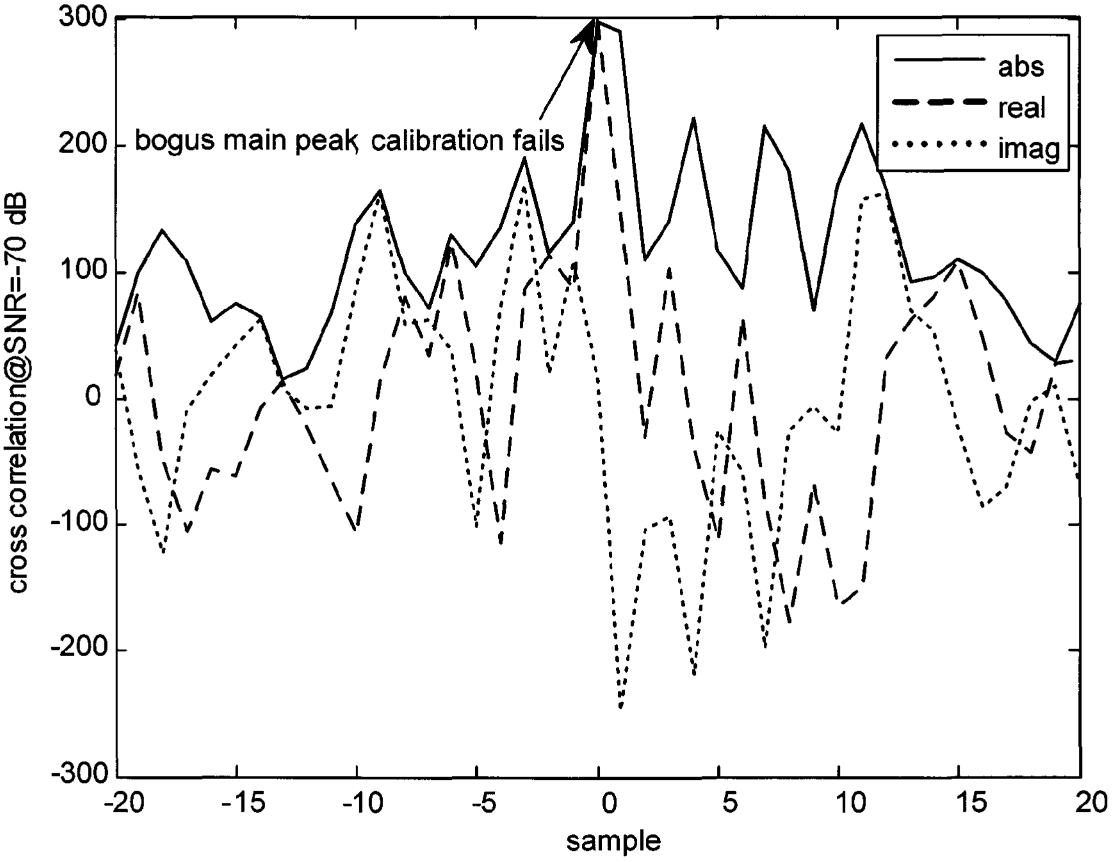
FIG. 6 shows the cross-correlation signal between calibration signal and transmitted signal.

To demonstrate this, consider a signal to noise ratio between the calibration signal 45 and the payload signal 20 of −70 dB. Without interference cancellation, the interference from the payload signal 20 dominates the cross correlation signal between the calibration signal 45 and the measured sum signal. This means that a peak detected by the calibration unit 80 may not be the main peak (as is shown in FIG. 6). If the main peak is not detected, this yields completely senseless phase and amplitude correction values and renders the calibration inoperable.

Figure 7:
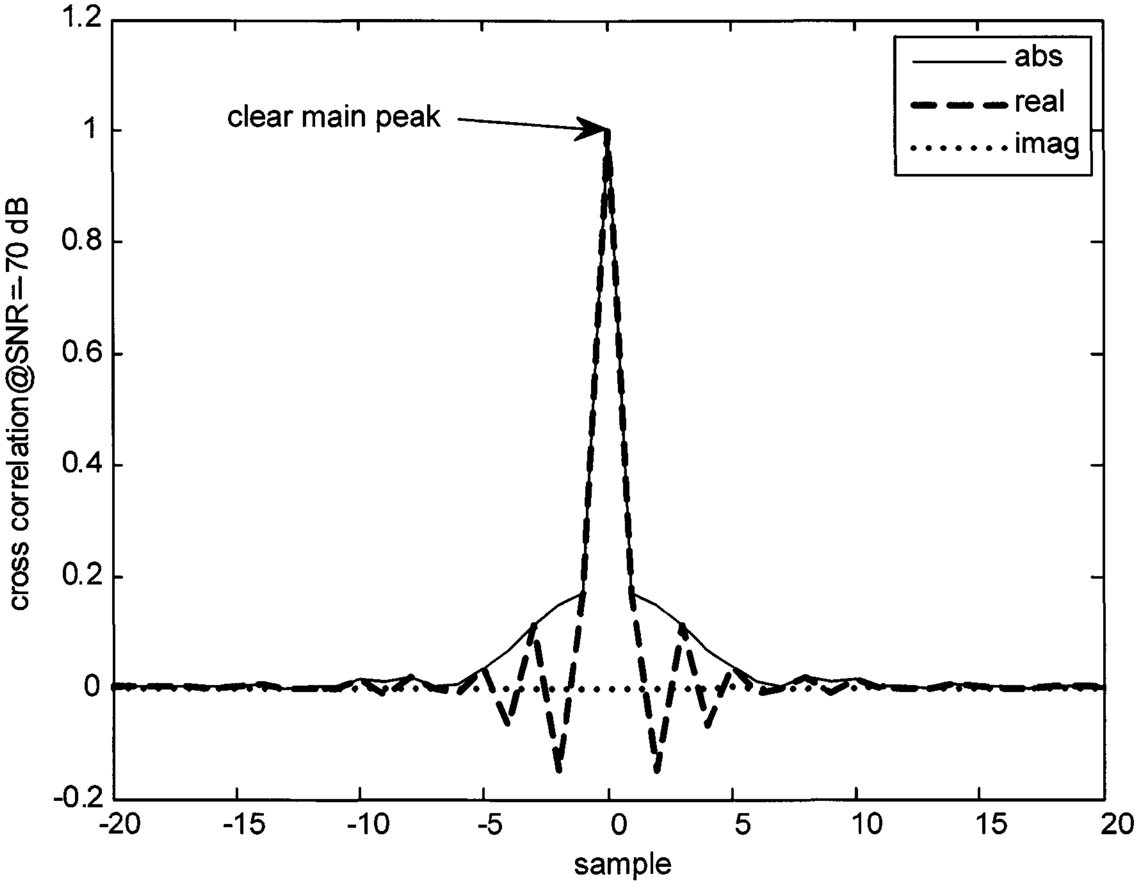
FIG. 7 shows the cross-correlation between calibration signal and interference compensated signal.

However, by using the interference cancellation of the present system, the situation changes. Even though the power of the payload signal 20 is larger than the power of the calibration signal 45 by several orders of magnitude, the cross correlation possesses a sharp main peak, as is shown in FIG. 7. From the main peak of FIG. 7, the magnitude and phase deviation can be calculated with high accuracy.

Figure 8:
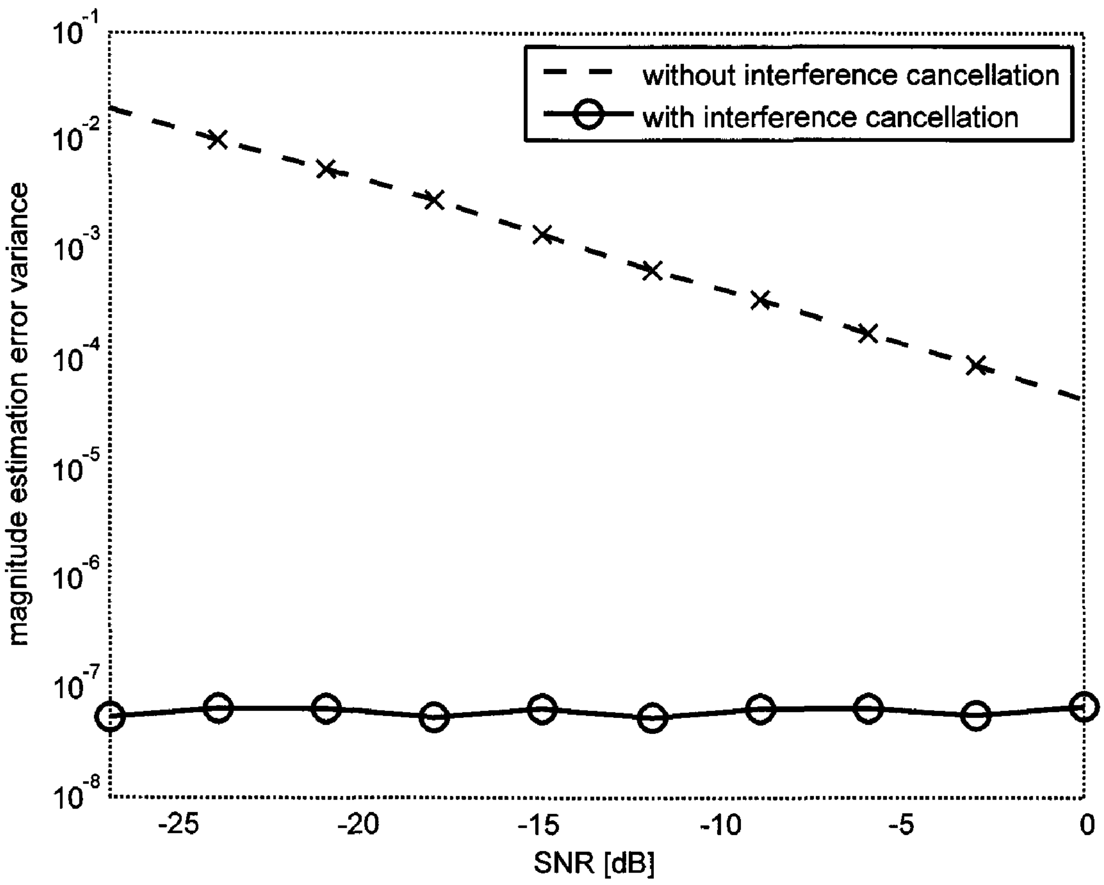
FIG. 8 shows the influence of interference cancellation on the magnitude error variance.
Figure 9:
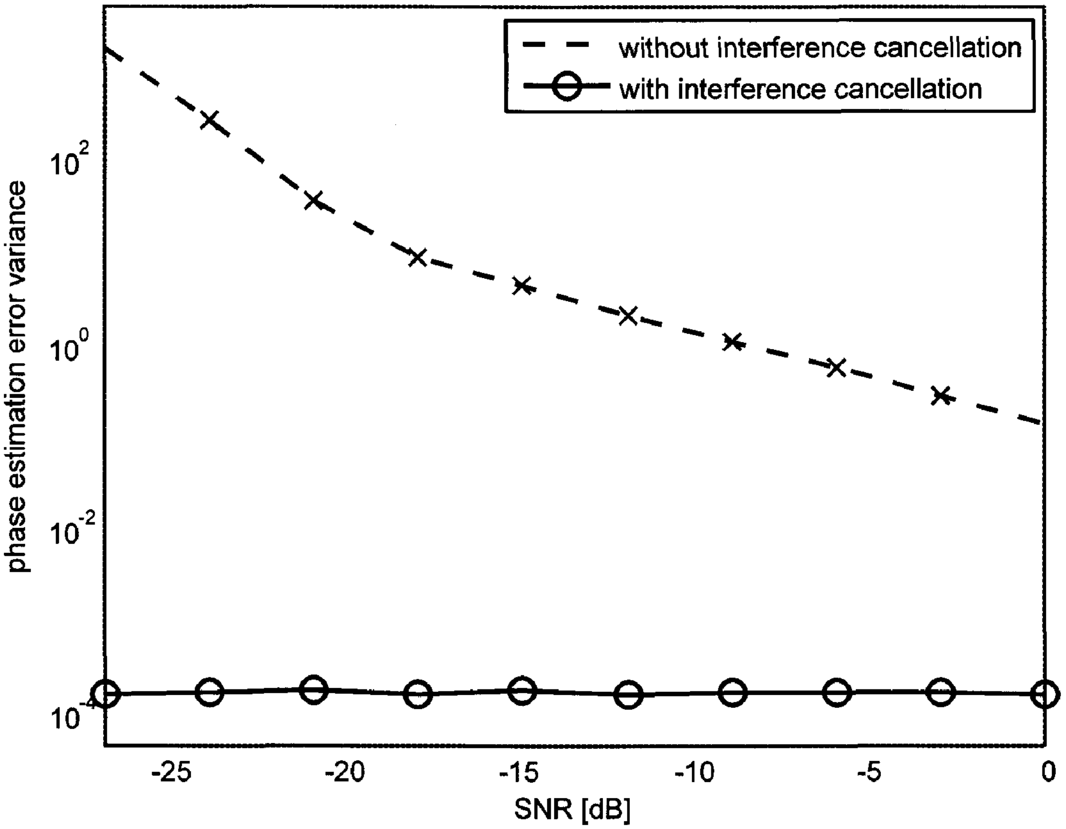
FIG. 9 shows the influence of interference cancellation on the phase error variance.

FIGS. 8 and 9 show the magnitude and phase error variance for the calibration system of the present system in comparison to a standard calibration system without interference cancellation. It can be seen from FIGS. 8 and 9 that the interference cancellation of the present system enables the achievement of high calibration accuracy, even for bad signal to noise ratios.

While various embodiments of the present system have been described above, it should be understood that they have been presented by way of example, and not limitation. It will be apparent to persons skilled in the relevant arts that various changes in form and detail can be made therein without departing from the scope of the invention. For example, in addition to using hardware (e.g., within or coupled to a Central Processing Unit ("CPU"), microprocessor, microcontroller, digital signal processor, processor core, System on Chip ("SOC"), or any other device), implementations may also be embodied in software (e.g., computer readable code, program code, and/or instructions disposed in any form, such as source, object or machine language) disposed, for example, in a computer usable (e.g., readable) medium configured to store the software. Such software can enable, for example, the function, fabrication, modelling, simulation, description and/or testing of the apparatus and methods described herein. For example, this can be accomplished through the use of general programming languages (e.g., C, C++), hardware description languages (HDL) including Verilog HDL, VHDL, and so on, or other available programs. Such software can be disposed in any known computer usable medium such as semiconductor, magnetic disk, or optical disc (e.g., CD-ROM, DVD-ROM, etc.). The software can also be disposed as a computer data signal embodied in a computer usable (e.g., readable) transmission medium (e.g., carrier wave or any other medium including digital, optical, or analog-based medium). Embodiments of the present system may include methods of providing the apparatus described herein by providing software describing the apparatus and subsequently transmitting the software as a computer data signal over a communication network including the Internet and intranets.

It is understood that the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the above-described exemplary embodiments, but should be defined only in accordance with the following claims and their equivalents.

REFERENCE NUMERALS

10 Antenna Array
20 Signals
25 Wanted signal
30 Transceiver modules
35-1 to -k Transmitter path
40-1 to -k Calibration signal generator
42 Switch
45 Calibration signals
50-1 to 50-K Calibration signal mixer
60 Path summer
65 Path sum signal
70 signal detection unit
80 Calibration unit
90 Interference estimator
92 Estimated interference signal
95 Estimation signal mixer
97 Difference input signal

The invention claimed is:

1. An antenna array for the transmission of signals, the antenna array comprising:

a plurality of transmission paths for transmitting a plurality of wanted signals, at least one calibration signal generator for the generation of a at least one calibration signal;

a plurality of calibration signal mixers for mixing the at least one calibration signal with the plurality of wanted signals to produce a plurality of transmission signals;

a path sum signal device for summing the plurality of transmission signals to produce a summed transmission signal;

an interference estimator that accepts the at least one calibration signal and generates an estimated interference signal;

an estimation signal mixer for subtracting from the summed transmission signal the estimated interference signal to produce a difference signal; and a signal detection unit for comparing the difference signal with the at least one calibration signal.

2. The antenna array of claim 1, further comprising a calibration unit connected to the calibration detector for producing correction factors for the plurality of calibration signals.

3. The antenna array of claim 1, further comprising a plurality of calibration signal generators for the generation of a plurality of calibration signals.

4. The antenna array of claim 3, wherein the plurality of calibrations signals are orthogonal to each other.

5. A computer program product embodied on a computer-readable medium and comprising executable instructions for the manufacture of the antenna array of claim 1.

6. The computer program product of claim 5, wherein the executable instructions are programmed in a hardware description language selected from the group consisting of Verilog, VHDL and RTL.

7. A method for the calibration of an antenna array comprising:

generating at least one calibration signal;

mixing the at least one calibration signal with the wanted signal to produce a plurality of transmission signals;

summing the plurality of transmission signals;

estimating an interference signal;

subtracting with the estimated interference signal from the summed plurality of transmission signals to produce a difference signal; and comparing the difference signal with the at least one calibration signal.

8. The method of claim 7, further comprising producing one or more correction factors for the plurality of calibration signals.

9. The method of claim 7, wherein the generating of the at least one calibration signal comprises the generation of a plurality of calibration signals.

10. The method of claim 8, further comprising the calibration of transmit paths by use of the one or more correlation factors.

* * * * *